March 29, 1949.  C. T. DE GROAT  2,465,793
FREEZING TRAP FOR VACUUM SYSTEMS
Filed March 19, 1948
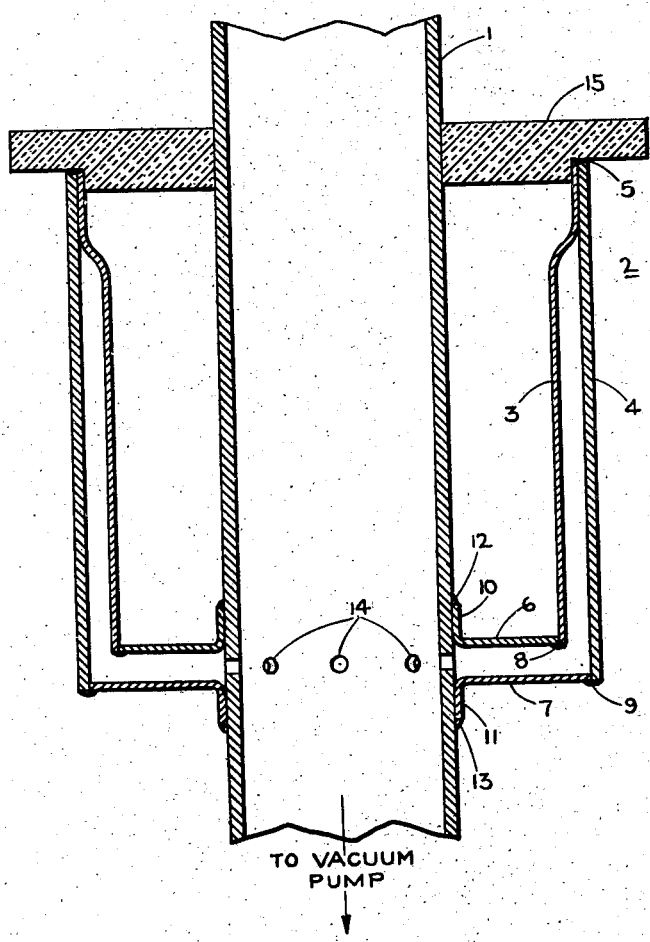
Inventor:
Charles T. De Groat,
by Morton D Moore
His Attorney.

Patented Mar. 29, 1949

2,465,793

UNITED STATES PATENT OFFICE 2,465,793

FREEZING TRAP FOR VACUUM SYSTEMS

Charles T. De Groat, Ballston Lake, N. Y., assignor to General Electric Company, a corporation of New York Application March 19, 1948, Serial No. 15,785

2 Claims. (Cl. 62—1)

My invention relates to freezing traps for use in vacuum systems for the purpose of freezing out condensible gases.

In vacuum systems, it is customary to provide a trap which normally depends from a vacuum conduit of the system and is adapted to be surrounded by a vessel such as a vacuum bottle containing liquid air, carbon dioxide or other refrigerant. The vacuum bottles are usually formed of glass and are easily broken. Also, the trap construction required for accommodating the bottle introduces substantial volume to the vacuum system which is objectional. It is also somewhat difficult to limit the action of the refrigerant to the period desired and as a result the vacuum pump is not effective to remove the condensible gases during most of the time. As a result, it is often necessary to provide some arrangement for periodically removing the vacuum bottle from the trap to allow it to warm up so that the condensible gases may be pumped off. In accordance with an important feature of my invention, I provide a very simple construction for use in a vacuum system which provides for the cooling of the vacuum conduit by means of a novel double walled vessel which is constructed as part of the vacuum system.

It is an object of my invention to provide a new and improved freezing trap for use in vacuum systems.

It is another object of my invention to provide a combined vacuum conduit and vessel for refrigerant which cooperate to provide a novel freezing trap.

Further objects and advantages of my invention will be come apparent as the following description proceeds reference being had to the accompanying drawing and its scope will be pointed out in the appended claims. In the drawing the single figure is a schematic representation of a preferred embodiment of my invention.

Referring now to the drawing, the illustrated embodiment of my invention includes a cylindrical conduit 1 which, in use forms a part of a vacuum system interposed between a vacuum pump and a device to be evacuated. A double walled vessel designated generally by the numeral 2 is provided by sheet metal side walls 3 and 4 which are joined together at their upper ends in any suitable manner, such as by welding as indicated at 5. The side walls extend in spaced relation and terminate at spaced points which are joined to the conduit 1 by apertured end walls 6 and 7. The walls 6 and 7 are welded to the side walls 3 and 4 as designated at 8 and 9 and are provided at their inner edges with circular flanges 10 and 11 which are welded to the conduit 1 as indicated at 12 and 13. The double walled vessel thus provided is arranged to be evacuated by the vacuum pump to which the conduit 1 is connected and to this end the conduit is provided with a plurality of openings 14 which communicate with the interior of the conduit 1 and the space between the end walls 6 and 7 of the vessel 2. The annular chamber provided by the vessel and conduit 1 is adapted to receive a refrigerant, such as liquid air or carbon dioxide. The vessel is preferably provided with a cover 15 of thermally insulating material, such as asbestos board.

The trap described above has been found to be very effective in use. When used for a repetitive operation, the amount of refrigerant required to freeze out the condensible gases for the desired interval of time is readily determined. This amount of refrigerant is then applied to the vessel at each operation and as it becomes evaporated, the trap warms up and the condensible gases may be drawn off by the vacuum pump of the system. The communication between the vacuum system and the interior of the vessel renders it effectively a vacuum bottle as far as conserving the refrigerant employed is concerned. In use traps embodying my invention have been found to be cheaper, easier to operate and more effective than the conventional freezing traps of the prior art.

While a particular embodiment of the invention has been shown and described, it will be obvious to those skilled in the art that changes and modifications may be made without departing from the invention in its broader aspects, and it is, therefore, the aim in the appended claims to cover all such changes and modifications as fall within the true spirit and scope of this invention.

What I claim as new and desired to secure by Letters Patent of the United States is:

1. A conduit for connection in a vacuum system, a double walled vessel having an apertured end wall through which said conduit extends, said conduit and the walls of said vessel being hermetically joined together and said conduit having an opening through the wall thereof communicated with the space between the walls of said vessel.

2. A conduit for connection in a vacuum system including a pair of cylindrical walls extending in spaced relation and hermetically joined together at one end, a pair of spaced end walls joined to the other end of said cylindrical walls and to said conduit and an opening through the wall in said conduit communicating with the space between the walls of said vessel.

CHARLES T. DE GROAT.

REFERENCES CITED

The following references are of record in the file of this patent:

UNITED STATES PATENTS

| Number | Name | Date |
|---|---|---|
| 2,370,703 | Zaikowski | Nov. 6, 1945 |